(12) United States Patent
Chencinski et al.

(10) Patent No.: US 8,644,136 B2
(45) Date of Patent: *Feb. 4, 2014

(54) SIDEBAND ERROR SIGNALING

(71) Applicant: International Business Machines Corporation, Armonk, NY (US)

(72) Inventors: Edward W. Chencinski, Poughkeepsie, NY (US); Michael Jung, Frankfurt am Main (DE); Martin Rehm, Boeblingen (DE); Philip A. Sciuto, LaGrange, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/716,434

(22) Filed: Dec. 17, 2012

(65) Prior Publication Data

US 2013/0111258 A1    May 2, 2013

Related U.S. Application Data

(63) Continuation of application No. 13/151,107, filed on Jun. 1, 2011.

(51) Int. Cl.
*H04L 1/00*   (2006.01)

(52) U.S. Cl.
USPC ........... 370/227; 370/220; 370/224; 370/247; 370/255; 709/224; 709/239

(58) Field of Classification Search
USPC ................. 370/216–220, 224–228, 241–253; 350/254–255
See application file for complete search history.

(56) References Cited

U.S. PATENT DOCUMENTS

| | | | | |
|---|---|---|---|---|
| 5,220,567 A * | 6/1993 | Dooley et al. | ................. | 714/704 |
| 5,321,698 A * | 6/1994 | Nguyen et al. | .................. | 714/17 |
| 5,519,693 A * | 5/1996 | Galuszka et al. | ............. | 370/276 |
| 6,078,736 A | 6/2000 | Guccione | | |
| 6,188,701 B1 * | 2/2001 | Tsukamoto et al. | .......... | 370/535 |
| 6,292,910 B1 * | 9/2001 | Cummins | ....................... | 714/43 |
| 6,314,477 B1 | 11/2001 | Cowger et al. | | |

(Continued)

FOREIGN PATENT DOCUMENTS

| CN | 1051420 C | 4/2000 |
|---|---|---|
| CN | 1904841 A | 1/2007 |

(Continued)

OTHER PUBLICATIONS

Chencinski, E.W. et al., "IBM System z10 I/O Subsystem," IBM J. Res. & Dev., vol. 53, No. 1, p. 6, Jan. 2009, pp. 6:1-6:13.

(Continued)

*Primary Examiner* — Jeffrey M Rutkowski
*Assistant Examiner* — Rasha Fayed
(74) *Attorney, Agent, or Firm* — Steven Chiu, Esq.; Blanche E. Schiller, Esq.; Heslin Rothenberg Farley & Mesiti P.C.

(57) ABSTRACT

Fast error reporting is provided in networks that have an architected delayed error reporting capability. Errors are detected and reported without having to wait for a timeout period to expire. Further, failures of other components caused by the delay are avoided, since the delay is bypassed.

14 Claims, 5 Drawing Sheets

(56) References Cited

U.S. PATENT DOCUMENTS

| | | | |
|---|---|---|---|
| 6,557,101 B1 | 4/2003 | MacDonald et al. | |
| 6,760,302 B1* | 7/2004 | Ellinas et al. | 370/228 |
| 6,867,614 B1 | 3/2005 | LeGraverand et al. | |
| 6,937,063 B1 | 8/2005 | Sun et al. | |
| 7,096,398 B1 | 8/2006 | Mukherjee | |
| 7,210,000 B2 | 4/2007 | Creta et al. | |
| 7,231,560 B2 | 6/2007 | Lai et al. | |
| 7,412,555 B2 | 8/2008 | Wang | |
| 7,412,589 B2 | 8/2008 | Feiste | |
| 7,437,643 B2 | 10/2008 | Khanna et al. | |
| 7,443,869 B2 | 10/2008 | Solomon et al. | |
| 7,463,056 B1 | 12/2008 | Anderson et al. | |
| 7,482,835 B1 | 1/2009 | Sun et al. | |
| 7,519,865 B1 | 4/2009 | Maly et al. | |
| 7,616,508 B1 | 11/2009 | Landry et al. | |
| 7,676,611 B2 | 3/2010 | Hui et al. | |
| 7,685,380 B1 | 3/2010 | Khu | |
| 7,747,809 B2 | 6/2010 | Hanscom | |
| 7,774,638 B1* | 8/2010 | Cavanagh et al. | 714/4.2 |
| 7,782,760 B2 | 8/2010 | Froroth et al. | |
| 7,809,370 B2* | 10/2010 | Stolte et al. | 455/427 |
| 7,836,352 B2 | 11/2010 | Sharma et al. | |
| 7,853,774 B1 | 12/2010 | Wentzlaff | |
| 7,882,296 B2 | 2/2011 | Reed | |
| 7,885,122 B2 | 2/2011 | Landry et al. | |
| 2002/0129300 A1 | 9/2002 | Floyd et al. | |
| 2003/0012129 A1 | 1/2003 | Lee et al. | |
| 2003/0133461 A1* | 7/2003 | Ho et al. | 370/395.52 |
| 2003/0189895 A1* | 10/2003 | Limaye et al. | 370/216 |
| 2005/0060591 A1 | 3/2005 | Yoshiyama et al. | |
| 2006/0126503 A1 | 6/2006 | Huck et al. | |
| 2006/0159115 A1 | 7/2006 | Haneda et al. | |
| 2007/0104109 A1* | 5/2007 | Jiang | 370/244 |
| 2007/0195692 A1 | 8/2007 | Hagglund et al. | |
| 2007/0233821 A1 | 10/2007 | Sullivan et al. | |
| 2008/0163005 A1 | 7/2008 | Sonksen et al. | |
| 2008/0309349 A1 | 12/2008 | Sutono | |
| 2009/0201806 A1 | 8/2009 | Ding et al. | |
| 2009/0292960 A1 | 11/2009 | Haraden et al. | |
| 2009/0304007 A1* | 12/2009 | Tanaka et al. | 370/395.53 |
| 2010/0080119 A1* | 4/2010 | Ansorge | 370/225 |
| 2010/0083040 A1 | 4/2010 | Voigt et al. | |
| 2010/0177632 A1* | 7/2010 | Tarnanen | 370/225 |
| 2010/0226244 A1 | 9/2010 | Mizutani et al. | |
| 2010/0246408 A1* | 9/2010 | Kerber et al. | 370/242 |
| 2010/0251055 A1 | 9/2010 | Murakami et al. | |
| 2010/0306442 A1* | 12/2010 | Gregg | 710/313 |
| 2010/0325495 A1 | 12/2010 | Talla et al. | |
| 2011/0029706 A1 | 2/2011 | Bekooij et al. | |
| 2011/0170405 A1* | 7/2011 | Beecroft et al. | 370/217 |
| 2012/0311133 A1 | 12/2012 | Chencinski et al. | |
| 2012/0311206 A1 | 12/2012 | Chencinski et al. | |

FOREIGN PATENT DOCUMENTS

| | | |
|---|---|---|
| CN | 101043383 A | 9/2007 |
| CN | 101048985 A | 10/2007 |
| CN | 101097532 A | 1/2008 |
| CN | 101379671 A | 3/2009 |
| EP | 0947049 A1 | 10/1999 |

OTHER PUBLICATIONS

Blank, Annika et al., "Advanced Power Virtualization on IBM System p5," IBM.com/redbooks, Oct. 2005, pp. 1-452.

Mitchell, Jim et al., "IBM Power5 Process-based Servers: A Highly Available Design for Business-Critical Applications," Oct. 2005, pp. 1-44.

Patel, Bindesh et al., "Transaction-based Debug of PCI Express Embedded SoC Platforms," CompactPCI and AdvancedTCA Systems, Dec. 2004, pp. 1-4.

Paz-Vincente, R. et al., "Time-Recovering PCI-AER Interface for Bio-Inspired Spiking Systems," Proceedings of the SPIE—The International Society for Optical Engineering, vol. 5839, No. 1, pp. 111-118, May 2005 (Abstract Only).

"z/Architecture—Principles of Operation," SA22-7932-08, Ninth Edition, Aug. 2010, pp. 1-1496.

International Search Report and Written Opinion for PCT/IB2012/052296 dated Sep. 13, 2012.

International Search Report and Written Opinion for PCT/IB2012/052297 dated Sep. 13, 2012.

Office Action for U.S. Appl. No. 13/151,107 dated Feb. 21, 2013.

Final Office Action for U.S. Appl. No. 13/151,107 dated Jul. 1, 2013, pp. 1-30.

Office Action for U.S. Appl. No. 13/151,119 dated Sep. 10, 2013, pp. 1-19.

Office Action for U.S. Appl. No. 13/459,162 dated Sep. 10, 2013, pp. 1-21.

* cited by examiner

SIDEBAND ERROR SIGNALING

This application is a continuation of co-pending U.S. Ser. No. 13/151,107, entitled "SIDEBAND ERROR SIGNALING," filed Jun. 1, 2011, which is hereby incorporated herein by reference in its entirety.

BACKGROUND

One or more aspects of the invention relate, in general, to processing within a communications environment, and in particular, to facilitating error processing within a network of the communications environment.

Enterprise class computing systems, such as System z® offered by International Business Machines Corporation, implement advanced techniques to ensure the integrity of customer data and to provide nearly continuous service in the presence of hardware failure. Logic components which are integrated into such enterprise systems incorporate self-test error checking logic to detect component malfunction. In case of detection of malfunction, the integrity of customer data that currently traverses the respective component cannot be guaranteed. Thus, a malfunctioning component that threatens the integrity of the operations passing through it fences itself from the computing system immediately. This can be achieved by placing the malfunctioning component into a reset state, among other ways.

These enterprise class features have only recently been added to certain interconnect technologies, such as PCI (Peripheral Component Interconnect) and PCIe (PCI Express). As PCI and PCIe have evolved, their protection and recovery design points have grown increasingly sophisticated, including adding enterprise class features, such as fencing. However, sudden fencing of a component was not envisioned in the PCI Express standard (maintained by PCI Special Interest Group (PCI SIG)), and therefore, unfavorable situations have arisen.

BRIEF SUMMARY

The shortcomings of the prior art are overcome and advantages are provided through the provision of a method of facilitating processing within a network. The method includes, for instance, detecting by a first network component of the network that a malfunction associated with the first network component has occurred, the first network component being coupled to a link that is non-operational due to the malfunction and is designed for automatic link recovery; and providing an indication of the malfunction to a second network component, wherein the providing bypasses the automatic link recovery performed for the link coupled to the first network component, the automatic link recovery designed to delay a predetermined amount of time prior to confirming there is a malfunction, and wherein the providing is performed absent waiting the predetermined amount of time for the automatic link recovery to confirm the malfunction.

Apparatus and computer program products relating to one or more aspects of the present invention are also described and may be claimed herein. Further, services relating to one or more aspects of the present invention are also described and may be claimed herein.

Additional features and advantages are realized through the techniques of one or more aspects of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of one or more aspects of the invention are apparent from the following detailed description taken in conjunction with the accompanying drawings in which:

DETAILED DESCRIPTION

In accordance with an aspect of the present invention, a capability is provided to facilitate error reporting and to avoid inducing failure conditions in components that are not directly related to the failing component. This capability includes using sideband error signaling to indicate an error, without delay, responsive to detecting the error. This capability is included in components based on, for instance, PCI technology. Thus, reliability is enhanced in communications environments integrating PCI-based technology, such as PCIe.

Figure 1A:
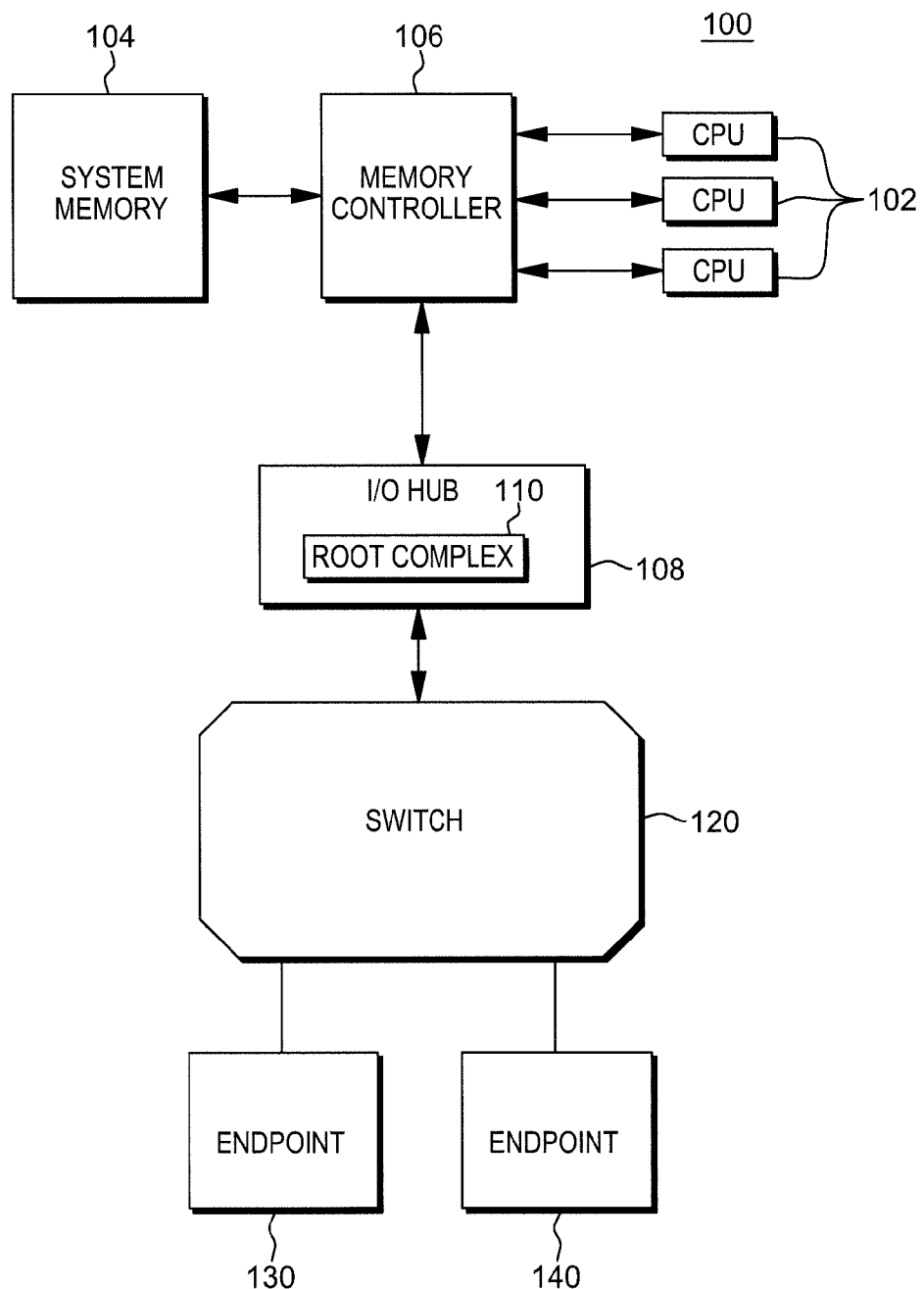
FIG. 1A depicts one embodiment of a communications environment to incorporate and use one or more aspects of the present invention.

One embodiment of a communications environment to incorporate and use one or more aspects of the present invention is described with reference to FIG. 1A. In one example, a communications environment 100 is a System z® server offered by International Business Machines Corporation. System z® is based on the z/Architecture® offered by International Business Machines Corporation. Details regarding the z/Architecture® are described in an IBM® publication entitled "z/Architecture®-Principles of Operation," IBM Publication No. SA22-7832-08, Ninth Edition, August 2010, which is hereby incorporated herein by reference in its entirety. IBM®, System z® and z/Architecture® are registered trademarks of International Business Machines Corporation, Armonk, N.Y. Other names used herein may be registered trademarks, trademarks or product names of International Business Machines Corporation or other companies.

In one example, communications environment 100 includes one or more central processing units (CPUs) 102 coupled to a system memory 104 (a.k.a., main memory) via a memory controller 106. To access system memory 104, a central processing unit 102 issues a read or write request that includes an address used to access system memory. The request, including the address (translated, if necessary), is received by memory controller 106, which accesses system memory.

In one example, memory controller 106 is comprised of hardware and is used to arbitrate for access to the system memory and to maintain the memory's consistency. This arbitration is performed for requests received from CPUs 102, as well as for requests received from one or more endpoints 130, 140. Like the central processing units, the endpoints issue requests to system memory 104 to gain access to the system memory.

In one example, endpoints 130, 140 are based on PCIe technology and may be part of one or more adapters. An endpoint issues a request that is routed to an input/output hub 108 (e.g., a PCIe hub) via one or more switches (e.g., PCIe switches) 120. In one example, the input/output hub is comprised of hardware, including one or more state machines, and is coupled to memory controller 106 via an IO-to-memory bus.

The input/output hub includes, for instance, a root complex 110 that receives a request from a switch, passes the request to the memory controller which accesses the memory. In this example, the root complex, switch and endpoints are network components of a communications network. The communications network is based on PCIe, and thus, each component is a PCIe device.

In a further embodiment of a communications environment, in addition to or instead of one or more CPUs 102, a central processing complex is coupled to memory controller 106. The central processing complex includes, for instance, one or more partitions or zones (e.g., logical partitions), one or more central processors, and a hypervisor used to manage the logical partitions. Other variations are also possible.

As described above, communications environment 100 includes a communications network, such as a PCIe network. Further details regarding components of the PCIe network are described with reference to FIG. 1B. In one embodiment, root complex 110 connects via a downstream port 112 and a link 114 (e.g., a PCI Express link) to an upstream port 122 of switch 120. This switch fans out via its downstream ports 124, 126 and via links 127, 128 to upstream ports 132, 142 of PCIe-based endpoints 130, 140. Each of the components in this example is based on PCIe. PCIe is a layered protocol consisting of a transaction layer, data link layer and a physical layer, each performing specific functions. These functions are specified in the PCI specification maintained by PCI SIG.

Although one example of a network, including various components, is shown and described, a network may include many additional components, such as more than one root complex, a plurality of switches coupled to one or more root complexes, a plurality of levels of switches (e.g., switches connected to other switches etc. and then to a root complex or one or more endpoints), as well as many more endpoints, as examples. This network, which may be part of a larger network, is descried herein to facilitate an understanding of situations that may arise in network processing and how these situations are addressed using one or more aspects of the present invention. Although a smaller network or a portion of a network is described herein, one or more aspects of the present invention apply equally well to larger networks.

Figure 1B:
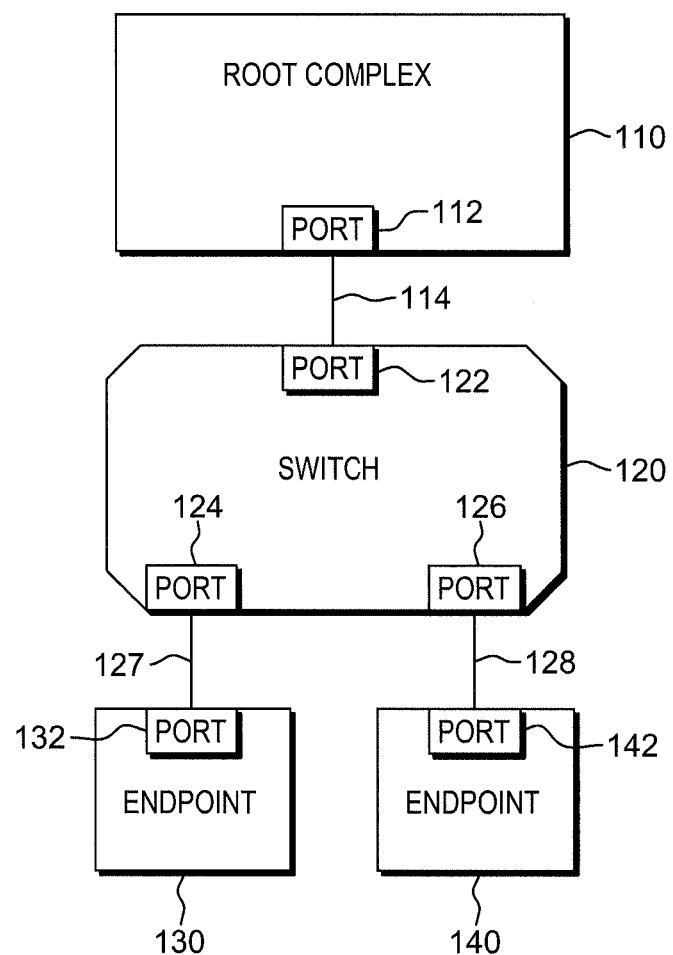
FIG. 1B depicts one embodiment of further details of a communications network of the communications environment of FIG. 1A, in accordance with an aspect of the present invention.

Continuing with reference to FIG. 1B, examples of undesirable situations that may arise during network processing using conventional PCIe components are described to facilitate an understanding of one or more aspects of the present invention. If, for instance, PCIe link 127 becomes non-operational, either because the components that constitute the link itself or upstream port 132 or complete endpoint 130 has a malfunction (referred to herein as a malfunction associated with the component (e.g., endpoint)), the physical layer of downstream port 124 will try to reestablish connectivity for a predetermined amount of time (e.g., 48 milliseconds). That is, for a PCIe port physical layer that has lost connectivity to the port on the remote side of the respective link, the logical layers further up the protocol stack (i.e., the transaction layer and the data link layer) do not immediately consider the link to be down. Instead, the physical layer attempts to reestablish connectivity. If connectivity can be achieved within the timeout window (e.g., 48 milliseconds), the data link layer will replay data packets that might have been corrupted during link recovery. Afterwards, the link is fully operational again. Note that the link was never considered to be down in the logical protocol stack layers during link recovery, but only temporarily unavailable.

However, if the timeout window expires and the link has not recovered, port 124 goes into a link down state and sends an error message upstream via port 122, link 114 and port 112 in order to notify root complex 110 of the failure. This may occur, for instance, when a component on the remote side of the link (e.g., endpoint 130) suddenly fences itself from the system (e.g., resets itself). Such fencing is not uncommon, since the instability of the link can be caused by the failures that are potentially corrupting the data in the first place. When the link becomes non-operational due to the fencing, as described above, the link recovery logic in the downstream port's physical layer (e.g., port 124) attempts to reestablish connectivity for the timeout window (e.g., 48 milliseconds). Since the component is in the reset state, the timeout window expires. Only after this timeout window expires is the link considered logically down and an error condition sent towards the root complex. Thus, whenever a component fences itself from the system due to a detected malfunction, the root complex is only notified after a substantial delay, such as a 48 millisecond delay. This delay itself constitutes a problem, as the root complex or other system components cannot immediately take further action upon a component malfunction.

Beyond the substantial (e.g., 48 millisecond) delay in recognizing that connectivity has been lost to the endpoint on the far side of the link, which is a problem in and of itself, this delay causes other undesirable situations. During the timeout window (e.g., 48 milliseconds), more data packets may be in flight which originate from the root complex and target the malfunctioned endpoint. Since the link (e.g., link 127) is not currently available, these packets are buffered in the components (e.g., switch 120) on the path towards the fenced component for potential later transmission. Therefore, a queue of pending data packets build ups. Once a component runs out of available buffer space, no further data packets can enter that component via its upstream port. For instance, once the buffer in switch 120 is full, it cannot receive any other data packets. This includes packets targeted for endpoint 140.

Thus, potentially, the queue may eventually reach into the upstream port of the next upstream PCI Express switch and so on (in larger networks). From this point on, all components attached to other downstream ports of the switch are effectively disconnected from the root complex until the timeout (e.g, 48 milliseconds) occurs. Once this timeout expires the issue is resolved since port 124 goes into link down state, causing all packets targeting the port to be discarded, freeing up the buffer space and lifting the blockage.

However, endpoint 140 might already have timed out on one or more operations. That is, components with time operations that timeout in less than the delay (e.g., 48 milliseconds) might thus be affected as well from an otherwise unrelated failure condition. This general problem is referred to as sympathy sickness. Endpoints which otherwise did not need to be considered corrupted by a failure in their peer, are now affected, and they require their own recovery action.

Thus, in accordance with an aspect of the present invention, a capability is provided to enhance PCIe reliability by providing a fast error reporting mechanism (e.g., when a PCIe attached component fences itself in the system); and to avoid inducing failure conditions in other components that are not directly related to the failing component. Embodiments of these aspects are described with reference to FIG. 2, which shows processing associated with a specific malfunctioning component, e.g., end point 130. Although an example is described as it relates to the malfunction of endpoint 130, one or more aspects of the present invention are equally applicable to other network components, including, but not limited to, other endpoints or various upstream components. The example relating to endpoint 130 is only to illustrate one or more aspects of the present invention.

Figure 2:
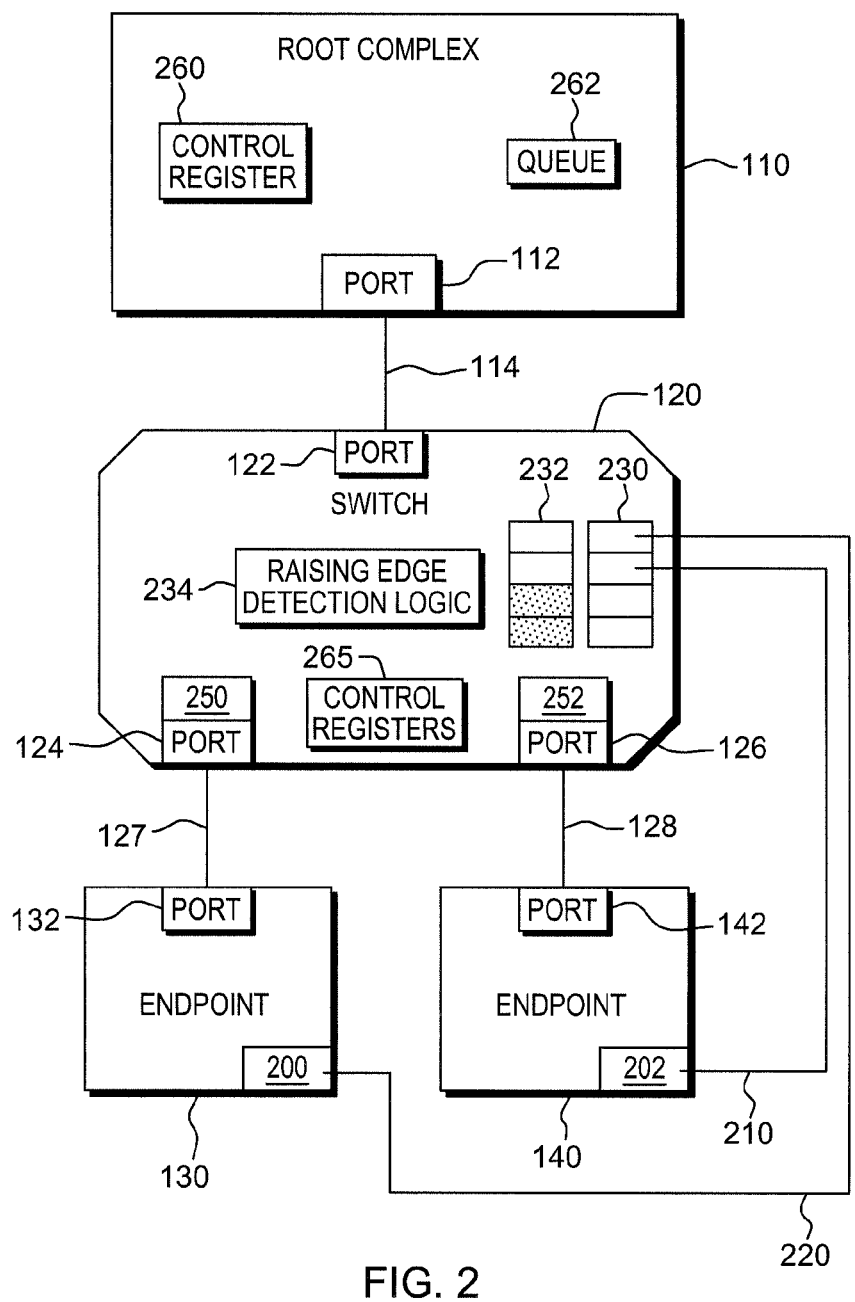
FIG. 2 depicts one embodiment of the communications network of FIG. 1B along with additional circuitry/logic to incorporate and/or use one or more aspects of the present invention.

Referring to FIG. 2, in one example, various components in the network (e.g. each component) include self-checking logic. This is shown in endpoints 130 and 140, which include self-checking logic 200 and 202, respectively. The self-checking logic includes, for instance, a parity check, cyclical redundancy check (CRC), error correction checking, etc. If a malfunction is detected in an endpoint (e.g., the endpoint fences itself), the self-checking logic puts the respective device 130 or 140 into a reset state immediately. Additionally, it asserts an IO_Error sideband signal 220 or 210, respectively (e.g., for the example described herein endpoint 130 is reset and sideband signal 220 is asserted). These signals are referred to as sideband signals since they are not part of the PCIe specification, but have been added in accordance with an aspect of the present invention. These IO_Error sideband signals are connected as inputs to the next upstream component, which in this example is switch 120.

Switch 120 includes an IO_Error status register 230 having a plurality of bit positions to receive IO_Error sideband signals 220, 210. Signals 220 and 210 are reflected at individual bit positions in IO_Error status register 230.

Associated with IO_Error status register 230 is an IO_Error mask register 232. Similar to IO_Error status register 230, IO_Error mask register 232 has a plurality of bit positions, each one corresponding to a bit position of IO_Error status register 230. When an IO_Error sideband signal is connected to a bit position in IO_Error status register 230 and error reporting is being provided for the component outputting the sideband signal, the corresponding bit in IO_Error mask 232 is set (e.g., to 1) to control propagation of the error to the status register.

Coupled to IO_Error status register 230 and IO_Error mask register 232 is raising edge detection logic 234. Raising edge detection logic 234 is triggered responsive to one of the IO_Error status bits in register 230, which is not masked out in IO_Error mask register 232, changing its value from, for instance, zero to one indicating a malfunction.

Responsive to the raising edge detection logic being triggered, it sends a PCIe message signaled interruption (MSI) via port 122, link 114 and port 112 to root complex 110 to notify the root complex of the component malfunction. Information used for the MSI is obtained from a device table entry located in the I/O hub. As a reaction to this MSI, the root complex reads IO_Error status register 230 to determine which component is malfunctioning. (In a further embodiment, if switch 120 is coupled to another switch, the MSI is sent to that switch and so on until it reaches the root complex.)

In one embodiment, this error reporting is triggered immediately after the malfunction has been detected. Consequently, the root complex and thus, the firmware running in a processor coupled to the root complex and configured to receive signals from the root complex, become aware of the condition in a period of time that is typically less than, for instance, one microsecond. The root complex, responsive to receiving the error signal, signals the processor, which takes action to prevent sympathy sickness and attempt to recovery any failing components. (Firmware, as used herein, includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.) This error reporting in less than, for instance, one microsecond is contrasted to the error reporting provided by the state-of-the-art PCIe, which results from a detected link down condition which in one example only happens 48 milliseconds after the malfunction has been detected at the endpoint.

Although, in this embodiment, the fast error reporting logic (e.g., sideband signals 210 and 220, registers 230 and 232, and logic 234) is shown for endpoint devices 130 and 140, this logic may be replicated on any level of the network. Thus, in accordance with an aspect of the present invention, switch 120 itself may also have self-checking logic to detect a malfunction, as well as an IO_Error sideband signal. Furthermore, root complex 110 would have its own copies of the IO_Error status and mask registers, as well as the raising edge detection logic. Finally, typical PCIe networks contain many elements and multiple levels of links One or more aspects of the present invention involved in reporting and handling IO_Error remain the same, but, as the network increases, the implementation scales up.

In a further aspect of the present invention, responsive to the root complex being notified of a malfunctioning component, the root complex notifies a processor configured for such notification, and action is taken to avoid sympathy sickness by preventing, for instance, the buildup of a queue of pending data packets. In one embodiment, one or more measures are taken to prevent sympathy sickness. In one particular example, the following measures are taken:

1) Processor code (e.g., firmware) running on the processor coupled to the root complex asserts a link restriction for link 114. This causes any request packets that target link 114 to be held back and deferred until the link restriction is released again. To assert the link restriction, in one example, an indicator (e.g., bit) specific to the link in a control register 260 located within the root complex (e.g., system area) is set. When a request is generated that targets link 114, the indicator is checked. If it is set, the request is deferred and, in one example, placed on a queue 262 of deferred requests located in the root complex, rather than a queue of pending data packets. In one example, requests (in contrast to responses) that are issued by the root complex are triggered by instructions being executed on one of the CPUs. Thus, firmware can hold back CPUs from issuing new requests by means of the 'link restriction', which is implemented in firmware.

2) Generation of a specific type of response packet is disabled. Typically in PCIe, posted request packets do not receive a response. However, some systems, such as System z®, have implemented an extended protocol on top of PCIe that provides response packets even for such request packets. Thus, an option is provided in the hub in which the root complex is located to allow the hub to disable the generation of such response packets. This feature is activated, by for instance, setting a latch, to keep such special response packets from contributing to the queue of pending data packets. For example, a latch control in register 260 is set. (As examples, control register 260 can be located within the root complex or hub.)

3) Further, special features 250 and 252 are provided to allow the hardware to disable the ports (e.g., downstream ports 124 and 126, respectively, of switch 120) immediately in order to purge pending data packets. This feature is activated by the hub (e.g., the root complex within the hub) to prevent the buildup of a queue of pending data packets. Features 250 and 252 are different from the standard PCIe port disable feature, which still attempts to notify the port on the far side of the link of the port disablement, which would run into the same substantial delay, e.g., 48 millisecond timeout, as the link down detection logic. In contrast, port disabled features 250 and 252 immediately disables their respective port (e.g., by setting an indicator in a control register 265 located within switch 120) and start purging respective data packets.

Thus, in the example above, port 124 is disabled via special feature 250.

Responsive to the error being reported and sympathy sickness being prevented, recovery on the malfunctioning component is attempted. Continuing with the above example, port 124 in switch 120 is enabled again via feature 250. If link 127 can be trained and endpoint 130 can be reinitialized, e.g., using standard PCI processing, recovery completes successfully. Otherwise, endpoint 130 is check-stopped by disabling port 124 via feature 250. Furthermore, the respective bit in IO_Error mask register 234 is asserted (i.e., set) to prevent future error reports (i.e., masked out) from the check-stopped component.

One embodiment of the logic used to perform fast error reporting and to prevent sympathy sickness is described with reference to FIG. 3.

Figure 3:
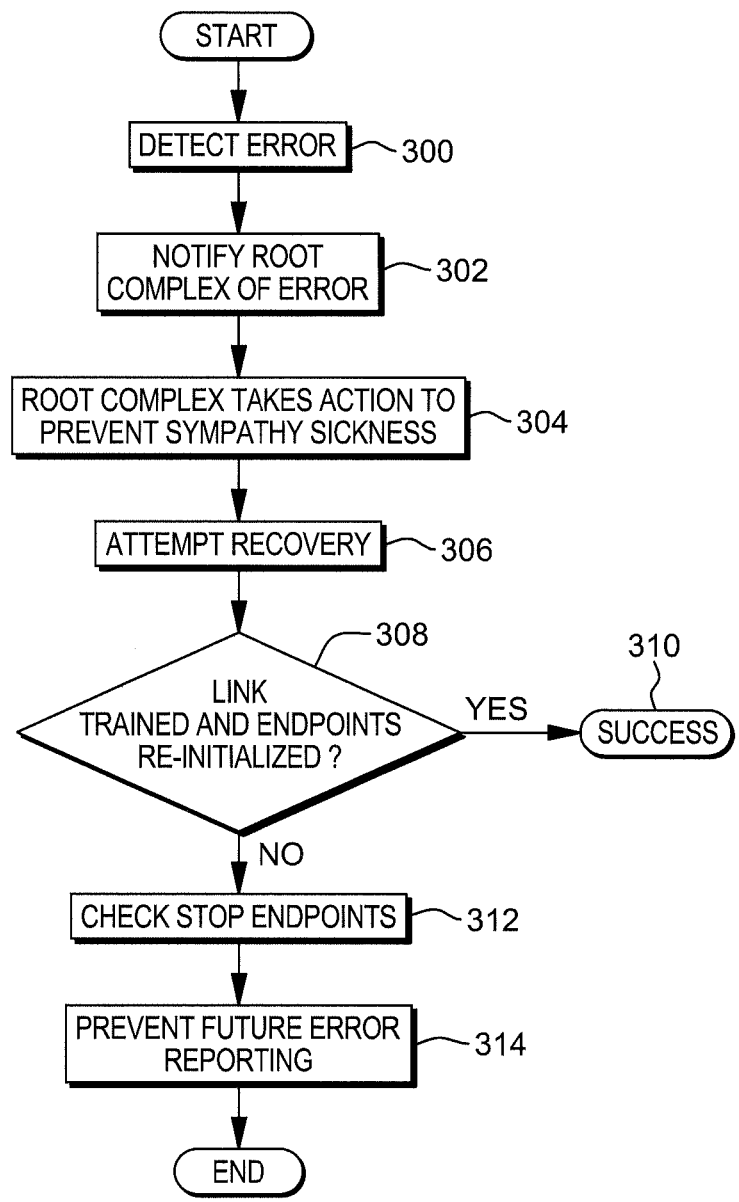
FIG. 3 depicts one embodiment of the logic associated with facilitating the detection, reporting and recovery from errors, in accordance with an aspect of the present invention.

Referring to FIG. 3, initially, an error is detected in a network component, STEP 300, and responsive thereto, error reporting is triggered immediately, STEP 302. For instance, the self-checking logic of the malfunctioning component places the component into a reset state, and asserts the IO_Error sideband signal, which ultimately causes an interrupt to be sent to the root complex.

The root complex determines which component has malfunctioned (based on the indicators in register 230) and signals a processor. The processor and root complex take action to prevent sympathy sickness, STEP 304. For instance, a link restriction is asserted; generation of special response packets are disabled (e.g., via setting one or more latches in control register 260); and ports are immediately disabled.

Thereafter, recovery is attempted, STEP 306. For instance, the switch or other network element attempts to train the failed link and reinitialize the component. For instance, measurements are taken and compared to a clock signal to determine specific timings to be used for the link. If the link is trained and the component is reinitialized as a result of attempting recovery, INQUIRY 308, then recovery is successful, STEP 310. Otherwise, the endpoint is check-stopped, STEP 312, and future error reporting is prevented, STEP 314.

Described in detail above is a technique for performing fast error reporting in components that typically are delayed in reporting errors and for preventing sympathy sickness in such components. In one example, sideband signals are provided, which are non-architected (i.e., not a part of the PCI design, standards or specification), and used to indicate an error. This reporting bypasses the automatic link recovery provided by PCI as an architected feature and allows reporting to proceed without waiting the predetermined amount of time (e.g., 48 ms) for the malfunction to be confirmed. This enhances reliability and availability of PCIe devices and the networks using those devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electromagnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 4:
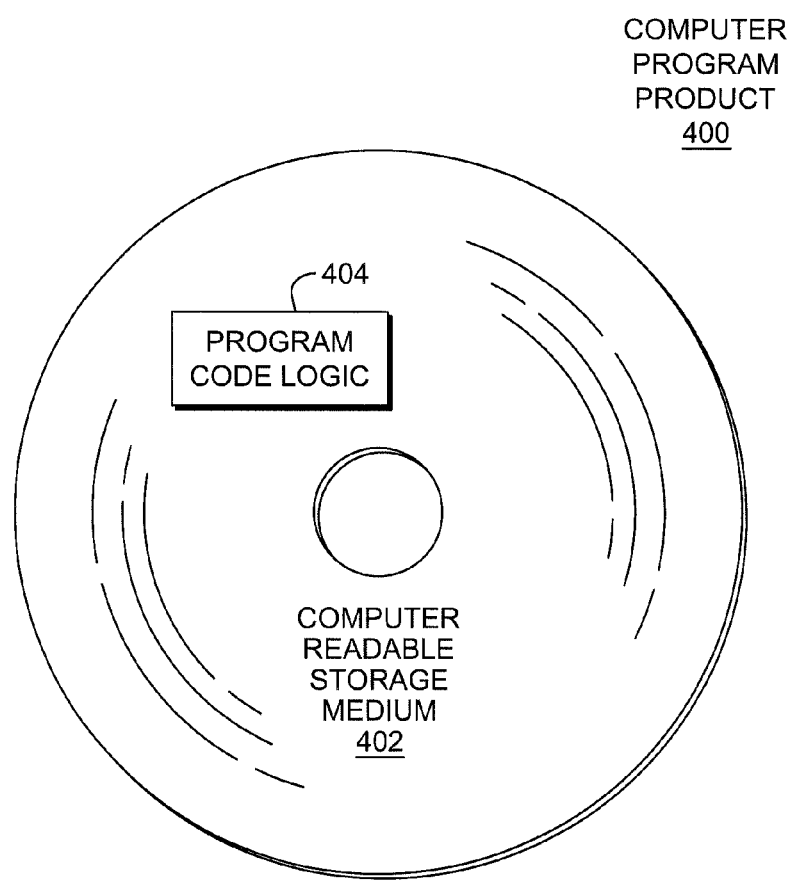
FIG. 4 depicts one embodiment of a computer program product incorporating one or more aspects of the present invention.

Referring now to FIG. 4, in one example, a computer program product 400 includes, for instance, one or more non-transitory computer readable storage media 402 to store computer readable program code means or logic 404 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. As examples, servers other than System z®, such as Enterprise 196 systems or other systems offered by International Business Machines Corporation or other companies can include, use and/or benefit from one or more aspects of the invention. Further, networks may include more, fewer and/or different network components than described herein. Yet further, other network interconnects may use and/or benefit from one or more aspects of the present invention. Other variations are also possible.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of facilitating processing within a network, said method comprising:
    detecting by a first network component of the network that a malfunction associated with the first network component has occurred, the first network component being coupled to a link that is non-operational due to the malfunction and is designed for automatic link recovery, the network being based on an architecture having an explicit architectural specification defining the architecture, the architectural specification specifying that automatic link recovery is to be performed in response to the malfunction, the automatic link recovery designed to delay a predetermined amount of time prior to confirming there is a malfunction; and
    reporting the malfunction to a second network component, the reporting to alert of the malfunction and to indicate that recovery is to be attempted, and wherein the reporting comprises:
        asserting by the first network component a sideband error signal to report the malfunction, the sideband error signal being coupled to the output of the first network component and an input of the second network component and the sideband error signal being non-architected in that it is not a part of the architectural specification, the asserting comprising setting an indicator in a position of a status register of the second network component to a defined value, the position corresponding to the sideband error signal for the first network component, and wherein the reporting bypasses the automatic link recovery which is an architected feature specified in the architectural specification, and wherein the reporting is performed absent waiting the predetermined amount of time for the automatic link recovery to confirm the malfunction.

2. The method of claim 1, wherein the network is based on peripheral component interconnect (PCI) technology and the architectural specification is the PCI specification.

3. The method of claim 1, wherein the asserting the sideband error signal is by self-checking logic of the first network component, the self-checking logic detecting the malfunction.

4. The method of claim 1, wherein the network comprises a root complex through a tree structure to one or more endpoints, and wherein the first network component comprises an endpoint or an upstream component of the network.

5. The method of claim 1, wherein the setting of the indicator to the defined value triggers an error indication to be provided to a third network component indicating the malfunction.

6. The method of claim 1, wherein the setting of the indicator to the defined value and based on a mask indicator corresponding to the indicator being clear triggers an error indication to be provided to a third network component indicating the malfunction.

7. The method of claim 5, wherein based on the third network component receiving the error indication, further comprising performing at least one of link restriction on a link coupling the third network component and the second network component, disabling generation of a pre-defined type of response packet, and disabling one or more downstream ports of the second network component to purge pending data packets.

8. The method of claim 7, further comprising:
    attempting recovery of the first network component;
    determining whether recovery was successful; and
    check-stopping the first network component, based on determining recovery was unsuccessful.

9. The method of claim 8, further comprising preventing future error reports from the check-stopped component.

10. The method of claim 1, wherein the malfunction resulted from the first network component fencing itself from a network including the first network component and the second network component.

11. The method of claim 6, wherein the mask indicator is located in a mask register in the second network component.

12. The method of claim 11, wherein the mask register has a plurality of positions corresponding to a plurality of positions of the status register, one or more of the plurality of positions in the status register corresponding to one or more sideband signals of one or more network components of the network.

13. The method of claim 5, wherein the error indication is provided to the third network component via a raising edge detector sending a message signaled interrupt (MSI) to the third network component, wherein information for the MSI is obtained from a device table entry located in an input/output hub of the network.

14. The method of claim 5, wherein the third network component uses the status register to determine which component of the network is malfunctioning.

* * * * *